(12) United States Patent
Zhou et al.

(10) Patent No.: US 12,737,501 B2
(45) Date of Patent: Sep. 15, 2026

(54) OUT-OF-BAND FILE INTEGRITY CHECK

(71) Applicant: Fortinet, Inc., Sunnyvale, CA (US)

(72) Inventors: Xu Zhou, Saratoga, CA (US); Jia Tong, San Jose, CA (US); Dengxue Yan, San Jose, CA (US); Chien-An Chen, Milpitas, CA (US)

(73) Assignee: FORTINET, INC., Sunnyvale, CA (US)

( * ) Notice: Subject to any disclaimer, the term of this patent is extended or adjusted under 35 U.S.C. 154(b) by 55 days.

(21) Appl. No.: 18/757,649

(22) Filed: Jun. 28, 2024

(65) Prior Publication Data

US 2025/0371196 A1 Dec. 4, 2025

Related U.S. Application Data

(60) Provisional application No. 63/654,817, filed on May 31, 2024.

(51) Int. Cl.
*G06F 21/64* (2013.01)

(52) U.S. Cl.
CPC .................................... *G06F 21/64* (2013.01)

(58) Field of Classification Search
USPC ........................................................... 726/26
See application file for complete search history.

(56) References Cited

U.S. PATENT DOCUMENTS 11,698,969 B1 * 7/2023 Henriquez Garcia ........................ G06F 21/572 726/23
2011/0078791 A1 * 3/2011 Prakash ................ G06F 21/565 726/22
2011/0078799 A1 * 3/2011 Sahita ..................... G06F 21/53 726/26
2019/0034367 A1 * 1/2019 Kakaiya .............. G06F 12/1036
2025/0047744 A1 * 2/2025 Montero ............... H04L 67/025
2025/0254110 A1 * 8/2025 Robison .............. H04L 41/5054

* cited by examiner

*Primary Examiner* — Sakinah White-Taylor
(74) *Attorney, Agent, or Firm* — Jaffery Watson Hamilton & DeSanctis LLP

(57) ABSTRACT

Approaches to validating files on a memory device are described. A startup sequence for a host system having at least a hardware processor coupled with a memory device is initiated. The startup sequence includes at least reserving a memory queue for validation. The hardware processor of the host system accesses the memory device using a peer-to-peer communications protocol. A startup sequence is initiated for an integrity check agent including at least validating an out-of-band (OOB) operating system that functions independently of a host operating system running on the host system. The integrity check agent accesses the memory device using the reserved memory queue and the peer-to-peer communications protocol to check validity of one or more files stored on the memory device.

20 Claims, 8 Drawing Sheets

PROCESSOR(S) 704

INSTRUCTIONS TO CAUSE HOST OPERATING SYSTEM TO ACCESS THE MEMORY DEVICE USING A PEER-TO-PEER COMMUNICATION PROTOCOL 710

INSTRUCTIONS TO DETERMINE IF VALIDATION SYSTEM IS A VALIDATION AGENT OR A VALIDATION VIRTUAL MACHINE 712

INSTRUCTIONS TO PERFORM STARTUP OPERATIONS ON VALIDATION SYSTEM INCLUDING VALIDATING OOB OPERATING SYSTEM, IF VALIDATION AGENT 714

INSTRUCTIONS TO PERFORM STARTUP OPERATIONS ON VM VALIDATION SYSTEM INCLUDING VALIDATING OOB OPERATING SYSTEM IF VM 716

INSTRUCTIONS TO ACCESSES THE MEMORY DEVICE TO VALIDATE ONE OR MORE FILES USING THE RESERVED QUEUE AND THE PEER-TO-PEER COMMUNICATION PROTOCOL 718

INSTRUCTIONS TO DETERMINE IF A VALIDATION ERROR HAS OCCURRED 720

INSTRUCTIONS TO TRIGGER VALIDATION ERROR RESPONSE 722

NON-TRANSITORY COMPUTER-READABLE STORAGE MEDIUM 706

SYSTEM 702

FIG. 7

OUT-OF-BAND FILE INTEGRITY CHECK

CROSS-REFERENCE TO RELATED APPLICATIONS

The present patent application claims priority from U.S. Provisional Application No. 63/654,817 filed May 31, 2024, which is incorporated herein by reference.

BACKGROUND

Secure operating environments (e.g., cloud-based enterprise services) utilized files for various purposes. However, these secure operating environments can be compromised if one or more files within the secure operating environment are maliciously modified. Typically, host operating systems verify file integrity. However, when the host operating system has been compromised, verification by the host operating system may not be sufficient to protect the corresponding secure operating environment.

BRIEF DESCRIPTION OF THE DRAWINGS

To easily identify the discussion of any particular element or act, the most significant digit or digits in a reference number refer to the figure number in which that element is first introduced.

FIG. 7 is an example of a system (e.g., validation server or similar) to identify an image that has replaced an authenticated image.

DETAILED DESCRIPTION

Figure 1:
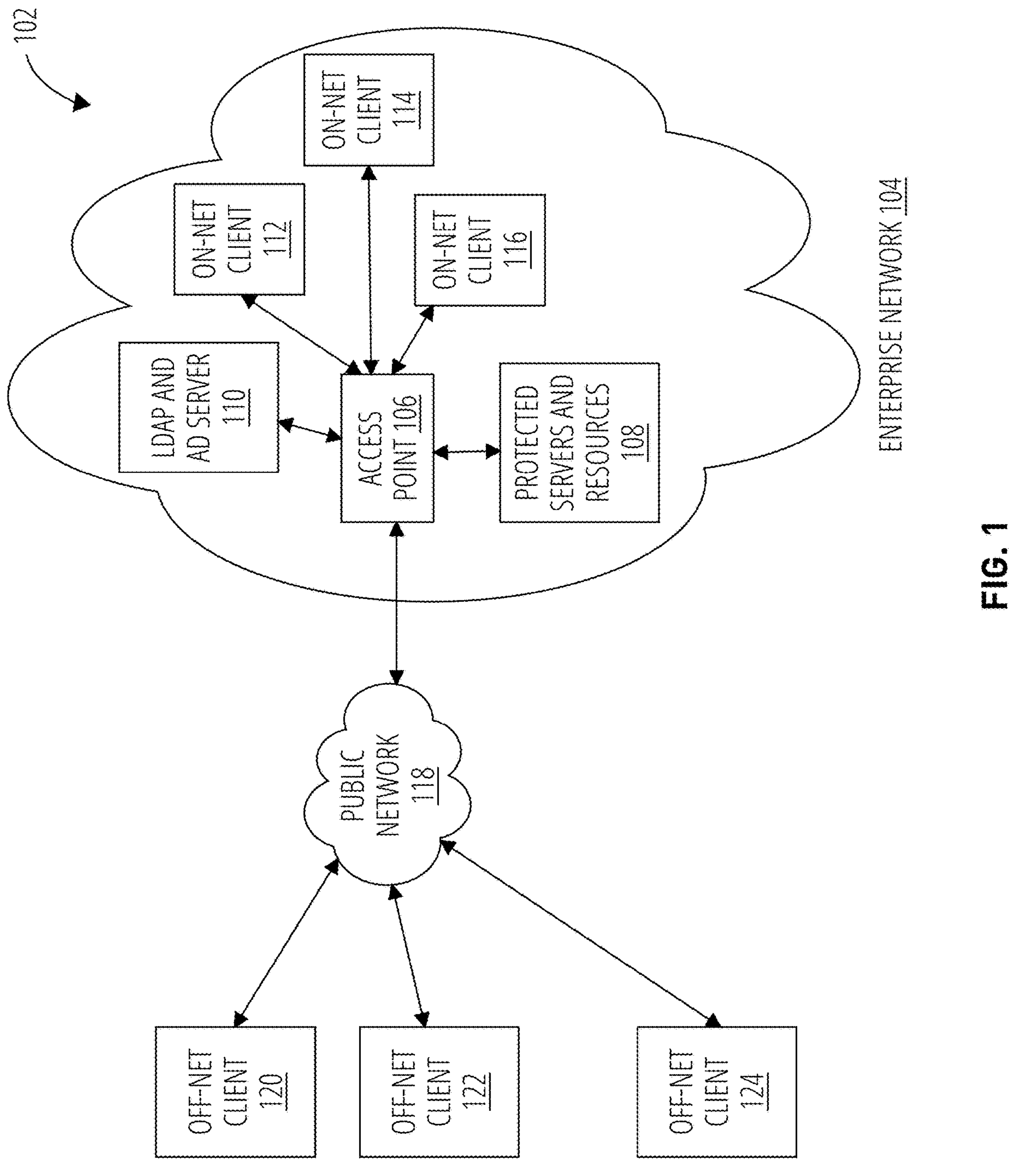
FIG. 1 is a block diagram illustrating an operating environment in which various embodiments of the present disclosure may be employed.

In the following description, numerous specific details are outlined to provide a thorough understanding of the embodiments of the present disclosure. It will be apparent, however, to one skilled in the art that embodiments of the present disclosure may be practiced without some of these specific details. In other instances, well-known structures and devices are shown in block diagram form.

One method of attacking network security appliances (described in greater detail below) is to covertly alter files on a disk used by the network security appliances. Generally, code signing operations are performed during boot time but not during run time. Thus, if a file is modified during run time, the modification can be undetected by file verification techniques, and the modified file could be used to introduce a security vulnerability.

In a host software-based security approach, file integrity checks are performed using a host operating system (OS) system call. A signature check is performed when an executable is about to run. The signature check will prevent a file with an incorrect signature from running. However, this approach could be ineffective if the host OS has been compromised. Thus, the approaches described herein provide an out-of-band (OOB) integrity check mechanism that can be utilized, which, because the OOB is isolated from the files being checked on the host system, can be effective even when the host OS has been compromised.

Appendix A includes additional example use case information.

Brief definitions of terms used throughout this application are given below.

An "image" refers to a file that contains the code for a specific device or system. Thus, a "firmware image" is a file that contains the firmware code for a specific device or system. The image file can include the necessary code for a device along with configuration settings, data structures, and/or other information required for the device to function properly. Firmware images differ from traditional application code because they contain all the necessary systems software to make hardware work (and may or may not include an operating system to achieve this result). Firmware images are commonly used in device such as computer systems, laptop computers, tablets, routers, printers, camera and other electronic devices. Firmware images are also used in other applications, such as industrial control systems, smart home devices, aviation, automotive applications, medical systems, military technologies, etc.

The term "client" generally refers to an application, program, process, or device in a client/server relationship that requests information or services from another program, process, or device (a server) on a network. Importantly, "client" and "server" are relative since an application may be a client to one application but a server to another. The term "client" also encompasses software that makes the connection between a requesting application, program, process, or device to a server possible, such as a file transfer protocol (FTP) client.

The phrase "endpoint protection platform" generally refers to cybersecurity monitoring and/or protection functionality performed on behalf of an endpoint (or client) device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may provide monitoring and/or protection functionality on behalf of the endpoint device via an agent, which may be referred to herein as an "endpoint security agent" deployed on the endpoint device. Non-limiting examples of an endpoint protection platform include the FORTIEDR Software as a Service (SaaS) platform and the FORTICLIENT integrated endpoint protection platform available from Fortinet, Inc. of Sunnyvale, CA. In some examples, the endpoint protection platform is a participant in a cybersecurity mesh architecture (CSMA) in which various cybersecurity products/solutions/tools of a given cybersecurity or networking security vendor or across a group of participating vendors achieve a more integrated security policy by facilitating interoperability and communication among the various cybersecurity products/solutions/tools (e.g., network security appliances, a secure access service edge (SASE) platform, etc.).

The phrase "endpoint security agent" generally refers to endpoint software that runs on an endpoint device (e.g., a desktop computer, a laptop computer, or a mobile device) and monitors for cybersecurity issues arising on the endpoint device and/or protects the endpoint device against cybersecurity issues. In some examples, the endpoint security agent may be deployed on the endpoint device as a fabric agent that delivers protection, compliance, and secure access in a single, modular, lightweight client. A fabric agent may be endpoint software that runs on an endpoint device and communicates with a telemetry connection or a cybersecurity mesh (e.g., the Fortinet Security Fabric available from Fortinet, Inc. of Sunnyvale, CA) to provide information, visibility, and control to that device. In some examples, the endpoint security agent may be in the form of a lightweight endpoint agent that utilizes less than one percent of CPU and less than 100 MB of RAM and may leverage, among other things, various security event classification sources provided within one or more associated cloud-based security services.

A non-limiting example of an endpoint security agent is the FORTICLIENT Fabric Agent available from Fortinet, Inc. of Sunnyvale, CA. In one example, to simplify the initial deployment and offload ongoing monitoring, an endpoint security agent may be managed and/or supported by one or more endpoint-focused managed services, for example, to provide setup, deployment, configuration, vulnerability monitoring, and overall endpoint security monitoring. In the context of a CSMA, the endpoint security agent may communicate with an endpoint protection platform, one or more network security appliances, and/or one or more cloud-based security services via a telemetry connection and/or via application programming interface (API) integration. In some examples, the endpoint security agent enables remote workers to connect to the network using zero-trust principles securely and may enable both Universal ZTNA and Virtual Private Network (VPN)-encrypted tunnels, as well as URL filtering and cloud access security broker (CASB). The endpoint security agent may additionally provide enhanced security capabilities through artificial intelligence (AI)-based NGAV, endpoint quarantine, and application firewall, as well as support for cloud sandbox, USB device control, and ransomware protection.

As used herein, a "network security appliance" or a "network security device" generally refers to a device or appliance in virtual or physical form that is operable to perform one or more security functions. A network security device may reside within the particular network that it is protecting, or network security may be provided as a service with the network security device residing in the cloud. Some network security devices may be implemented as general-purpose computers or servers with appropriate software to perform one or more security functions. Other network security devices may include custom hardware (e.g., one or more custom Application-Specific Integrated Circuits (ASICs)).

For example, while there are differences among network security device vendors, network security devices may be classified into three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines one or more CPUs, CPs, and NPs. Mid-range network security devices may include one or more multi-core CPUs, one or more separate NP Application-Specific Integrated Circuits (ASICs), and one or more CP ASICs. At the high end, network security devices may have multiple NPs and/or multiple CPs. A network security device is typically associated with a particular network (e.g., a private enterprise network) on behalf of which it provides one or more security functions.

Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data loss prevention (DLP), antispam, antispyware, logging, reputation-based protections, event correlation, network access control, vulnerability management, and the like. Such security functions may be deployed individually as part of a point solution or in various combinations as a unified threat management (UTM) solution.

Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

As used herein, "Zero-Trust Network Access" or "ZTNA" generally refers to a set of technologies and functionalities that enable secure access to internal applications for local or remote users (e.g., utilizing on-net endpoint or client devices within an enterprise network or off-net endpoint or client devices outside of the enterprise network, respectively). ZTNA represents the evolution of VPN remote access, bringing the zero-trust model to application access. ZTNA may be used to authenticate and authorize access to resources based on identity, device, and/or contextual data. ZTNA solutions typically grant access on a per-session basis to individual applications only after devices and users are verified.

As used herein, a "ZTNA Access Point" or "ZTNA AP" generally refers to any hardware device, software application, or combination of hardware and software that may be used to control access to protected network devices, servers, resources, services, TCP applications, and/or databases by a requesting endpoint device. In some cases, a ZTNA AP runs one or more access proxies, including a TFAP. Depending on the particular implementation, a ZTNA may be provided in virtual or physical form. For example, a ZTNA AP may be a virtual node or container that runs one or more access proxies or a network security appliance (e.g., a UTM appliance) that runs one or more access proxies.

As used herein, a "secure connection" generally refers to a connection provided through a computer network by one or more protocols that secure communication and data transfers via the connection, for example, via end-to-end encryption. Non-limiting examples by which a secure connection may be established include HTTPS, Hypertext Transport Protocol version 1.1 (HTTP 1.1) over SSL, Hypertext Transfer Protocol version 2.0 (HTTP 2.0) over SSL, Hypertext Transfer Protocol version 3.0 (HTTP 3.0) over Quick User Datagram Protocol (UDP) Internet Connections (QUIC).

A "computer" or "computer system" may be one or more physical computers, virtual computers, or computing devices. As an example, a computer may be one or more server computers, cloud-based computers, cloud-based clusters of computers, virtual machine instances, or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers unless expressly stated otherwise.

The terms "connected" or "coupled" and related terms are used in an operational sense and are not necessarily limited to a direct connection or coupling. Thus, for example, two devices may be coupled directly or via one or more intermediary media or devices. As another example, devices may be coupled so that information can be passed between them without sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," "in an example," "in some examples," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

FIG. 1 is a block diagram illustrating operating environment 102 in which various embodiments of the present disclosure may be employed. In the context of the present example, multiple off-net clients (e.g., off-net client 120, off-net client 122, off-net client 124) access enterprise network 104 via public network 118 (e.g., the Internet). The off-net clients may represent endpoint or client devices (e.g., workstations, desktop computers, laptop computers, or mobile devices) used by remote workers associated with a particular organization or enterprise.

In an example, enterprise network 104 includes Lightweight Directory Access Protocol (LDAP) and Active Directory (AD) (LDAP and AD) server 110, access point 106, protected servers and resources 108, and multiple on-net clients (e.g., on-net client 112, on-net client 114, on-net client 116). In an example, the on-net clients are locally attached client devices used by onsite workers. In an example, access point 106 is a network security appliance operable within enterprise network 104. Access point 106 may be responsible for controlling access to protected servers and resources 108, which may include various protected network devices, servers, resources, services, TCP applications, and/or databases. For example, as is known in the art, access point 106 may evaluate policies to determine what devices and users can access a given target service of protected servers and resources 108.

In an example, when a given user session matches a policy, access point 106 may set up a proxy tunnel session (e.g., a TFAP tunnel) between an endpoint security agent (not shown), running on a requesting endpoint device (e.g., one of the off-net clients or one of the on-net clients) and acting as a proxy on behalf of a client application (e.g., a browser), and the target service. In some cases, the evaluation of the policies may include consulting LDAP and AD server 110 regarding a user's AD group and/or domain. For example, access to one or more of protected servers and resources 108 may be limited to a requesting endpoint that belongs to AD. In some examples, access to certain Virtual Local Area Networks (VLANs) may be based on the logged in user's AD group membership. Deny policies can be used with endpoints when they fall outside of security posture policies; for example, access may be denied to certain resources or network segments if an endpoint is tagged with critical vulnerabilities.

One or more components illustrated in FIG. 1 can utilize Zero-Trust Network Access (ZTNA) technologies and functionalities that enable secure access to internal applications for local or remote users (e.g., utilizing on-net endpoint or client devices within an enterprise network or off-net endpoint or client devices outside of the enterprise network, respectively). ZTNA may be used to authenticate and authorize access to resources based on identity, device, and/or contextual data. ZTNA solutions typically grant access on a per-session basis to individual applications only after devices and users are verified.

Figure 2:
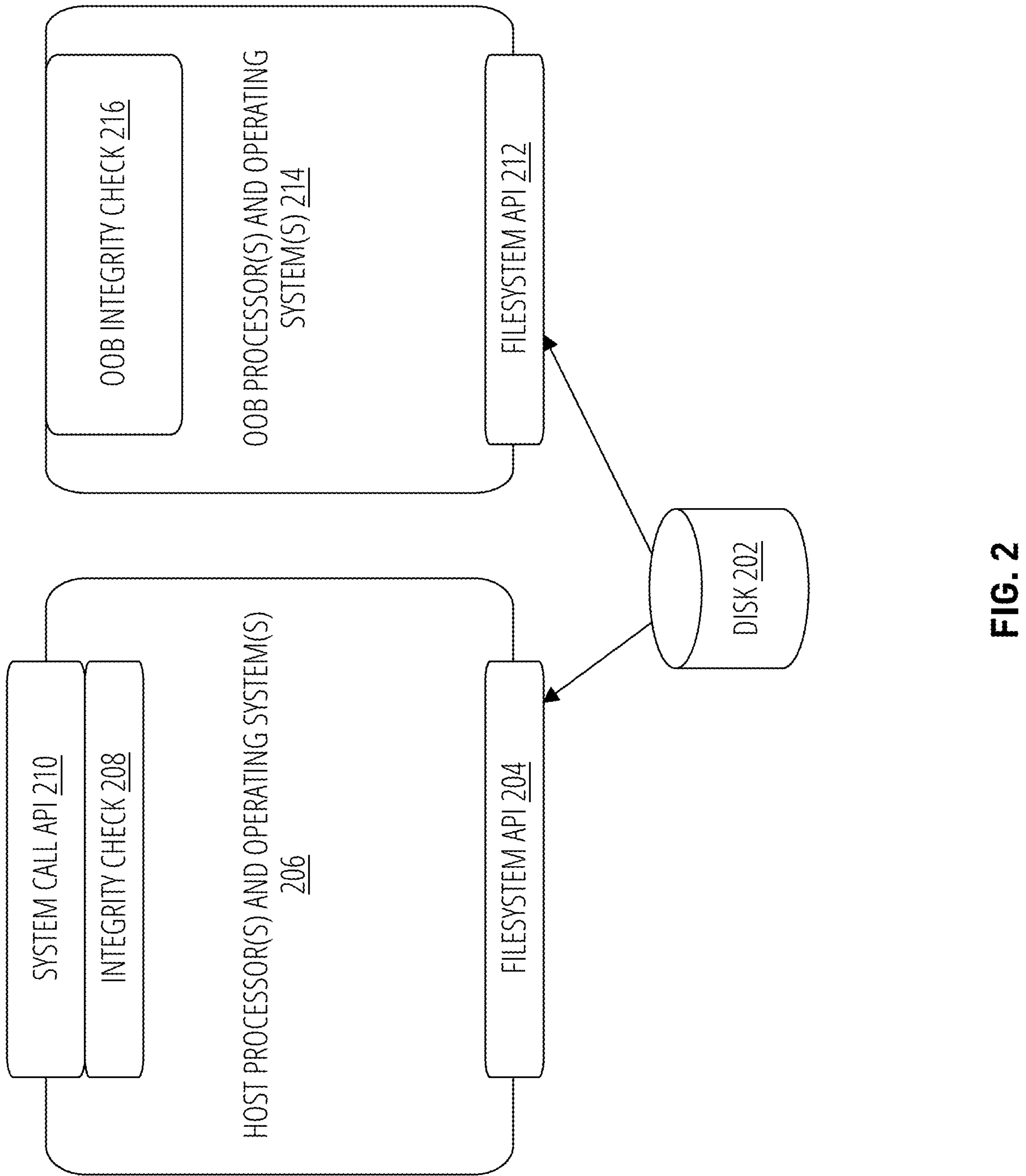
FIG. 2 is a block diagram of an example approach to provide out-of-band (OOB) integrity checks.

FIG. 2 is a block diagram of an example approach to provide out-of-band (OOB) integrity checks. In the example of FIG. 2, two systems are illustrated (e.g., host processor(s) and operating system(s) 206 and OOB processor(s) and operating system(s) 214). In an example, host processor(s) and operating system(s) 206 can be an off-net client (illustrated in FIG. 1 as off-net client 120, off-net client 122, off-net client 124) or can be an on-net client (illustrated in FIG. 1 as on-net client 112, on-net client 114, on-net client 116). In an example, OOB processor(s) and operating system(s) 214 can be an off-net client (illustrated in FIG. 1 as off-net client 120, off-net client 122, off-net client 124) or can be an on-net client (illustrated in FIG. 1 as on-net client 112, on-net client 114, on-net client 116), or OOB processor(s) and operating system(s) 214 can be access point 106 or other network device.

In an example, the host processor(s) and operating system(s) 206 and OOB processor(s) and operating system(s) 214 are independent of each other and are isolated from each other. In an example, host processor(s) and operating system(s) 206 and OOB processor(s) and operating system(s) 214 directly access files on disk 202 independently of each other. Because of this operational independence between host processor(s) and operating system(s) 206 and OOB processor(s) and operating system(s) 214, an integrity check by OOB processor(s) and operating system(s) 214 can be effective if host processor(s) and operating system(s) 206 has become corrupted.

In an example, host processor(s) and operating system(s) 206 can access files via filesystem API 204 in response to various requests that can be generated and/or received. In an example, host processor(s) and operating system(s) 206 can perform integrity check 208 as part of the process of responding to a request via system call API 210. However, if host processor(s) and operating system(s) 206 has been compromised, integrity check 208 may not effectively perform the desired protective functionality.

As described in greater detail below, OOB processor(s) and operating system(s) 214 can perform OOB integrity check 216 on one or more files on disk 202. Because OOB integrity check 216 is independent of host processor(s) and operating system(s) 206 and integrity check 208, OOB integrity check 216 can provide the desired protection when host processor(s) and operating system(s) 206 and integrity check 208 cannot.

Figure 3:
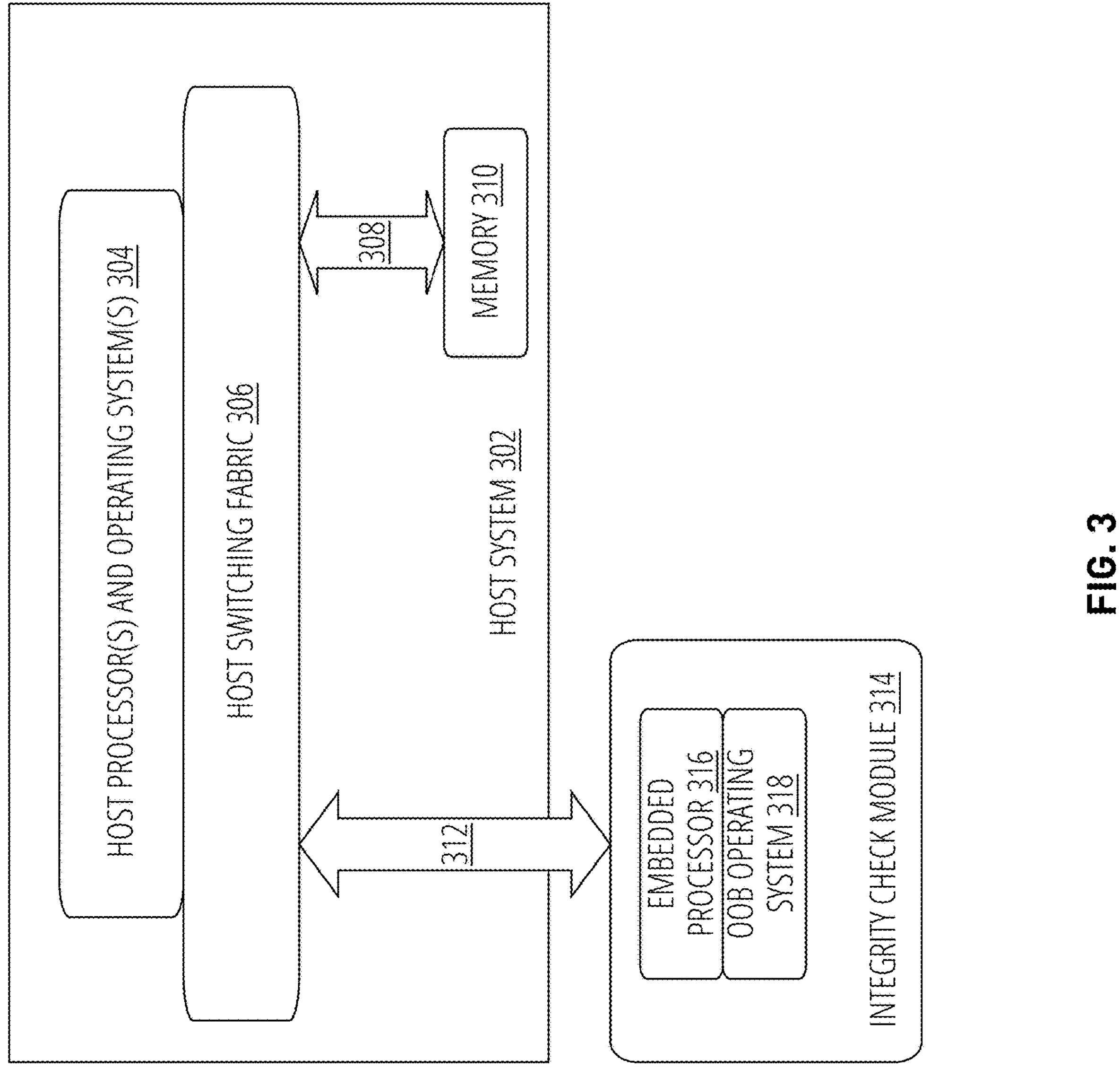
FIG. 3 is an example use case for an OOB integrity check architecture.

FIG. 3 is an example use case for an OOB integrity check architecture. The example of FIG. 3 utilizes the peer-to-peer functionality provided by PCIe switches and buses. PCIe generally refers to the Peripheral Component Interconnect (PCI) Express set of standards and related standards maintained by the PCI Special Interests Group (SIG) of San Francisco, California. PCI-SIG is a consortium that owns and manages PCI specifications as open industry standards. The organization defines industry standard I/O (input/output) specifications consistent with the needs of its members. PCI-SIG®, PCI Express®, and PCIe® are trademarks of PCI-SIG in the United States and other countries.

In the example of FIG. 3, host system 302 includes host processor(s) and operating system(s) 304 configured to communicate with memory 310 over host switching fabric 306 and switching fabric interconnect 308. In an example, host switching fabric 306 is a PCIe-compliant switching fabric (e.g., system bus). Other communications protocols can also be supported. In an example, switching fabric interconnect 308 and/or switching fabric interconnect 312 include PCIe-compliant physical interfaces that allow hardware devices (e.g., memory 310, integrity check module 314) to connect to host switching fabric 306.

Host system 302 can include additional components (e.g., network interfaces, input/output devices, additional storage devices and/or memory, GPU) not illustrated in FIG. 3. In the PCIe example, host processor(s) and operating system(s) 304 interacts with memory 310 according to PCIe protocols. In an example, memory 310 can be a non-volatile memory compatible with Non-Volatile Memory Host Controller Interface Specifications (NVMHCIS) available from NVM Express (NVMe). Thus, in some configurations, memory 310 can be referred to as an NVMe disk (or NVMe memory). Other types of memory can also be supported.

As described below, an eternal or otherwise isolated system can perform integrity checks on data stored in memory 310. In the example of FIG. 3, the isolated integrity check architecture is provided by integrity check module 314, having embedded processor 316 and OOB operating system 318 coupled with memory 310 via switching fabric interconnect 312, host switching fabric 306, and switching fabric interconnect 308. For example, the PCIe-supported peer-to-peer functionality is utilized to allow host processor(s) and operating system(s) 304 and OOB operating system 318 to interact with memory 310 independently. This allows integrity check module 314 to be an independent integrity checker of memory 310, even when host processor(s) and operating system(s) 304 and/or other components of host system 302 have been compromised. In an example, embedded processor 316 can be any embedded processor including, for example, an ARM Cortex-A76 embedded processor available from ARM Holdings of Austin, Texas. Other embedded processors (whether from ARM Holdings or other providers) can also be used to provide the functionality described herein.

In one example, integrity check module 314 can be coupled with host system 302 via a physical PCIe-compliant interface so that integrity check module 314 can be external to host system 302 while providing the functionality described herein. Integrity check module 314 can include additional components not illustrated in FIG. 3 (e.g., memory, input/output devices, network interfaces, card reader interfaces).

In an example, OOB operating system 318 is verified using a signature during the boot sequence for integrity check module 314. In an example, during startup of host system 302, at least one queue for memory 310 is allocated to integrity check module 314. In an example, OOB operating system 318 mounts a filesystem as read-only and continuously checks the integrity of one or more files stored by memory 310. In an example, all files stored by memory 310 are checked; however, as another example, only selected files stored by memory 310 are checked.

Figure 4:
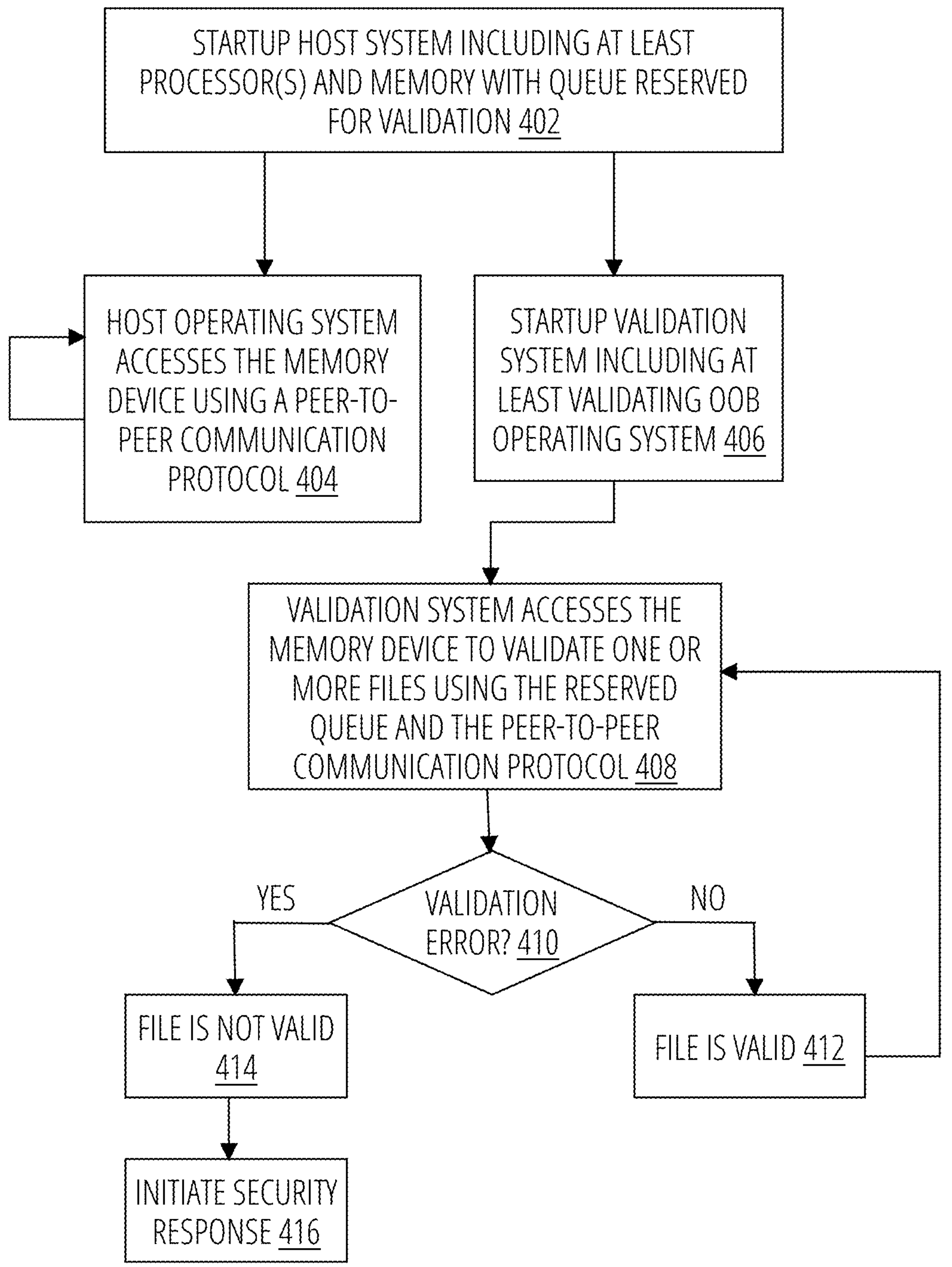
FIG. 4 is a flow diagram of an example approach to OOB integrity check functionality.

FIG. 4 is a flow diagram of an example approach to OOB integrity check functionality. The functionality described with respect to FIG. 4 can be utilized with, for example, the architecture of FIG. 3. Various approaches can be used to achieve this result.

In an example, the host system goes through a startup process where at least one queue for the memory system is reserved for validation purposes, 402. The startup process for the host system can involve various other procedures to prepare the host system for operation. In general, startup processes are well understood within the relevant arts.

After startup, the host system can utilize the host operating system to access the memory device using a peer-to-peer communication protocol, 404. The host operating system can access the memory device independently of, and in parallel with, validation operations that are performed on the memory device.

After the host system startup (e.g., 402), the validation system can go through a startup process where the validation system operating system (aka, OOB operating system) is validated. The startup process for the host system can involve various other procedures to prepare the host system for operation. In general, startup processes are well understood within the relevant arts.

After startup, the validation system can access the memory device using the reserved queue and the peer-to-peer communication protocol to verify one or more files stored on the memory device, 408. Various validation procedures can be utilized to verify files on the memory device. Because the peer-to-peer communication protocol is used, the validation processes can occur in parallel to memory accesses by the host operating system (e.g., 404).

As long as a validation error does not occur, 410, the file is considered valid, 412, and the validation system can continue the validation process, 408. When a validation error does occur, 410, the file is considered not valid, 414, and a security response is initiated, 416. In an example, failure of a validity check performed by the OOB operating system is considered a validation error (e.g., 410). In an example, failure to access the memory device (e.g., access being blocked or removed) is considered a validation error (e.g., 410).

Figure 5:
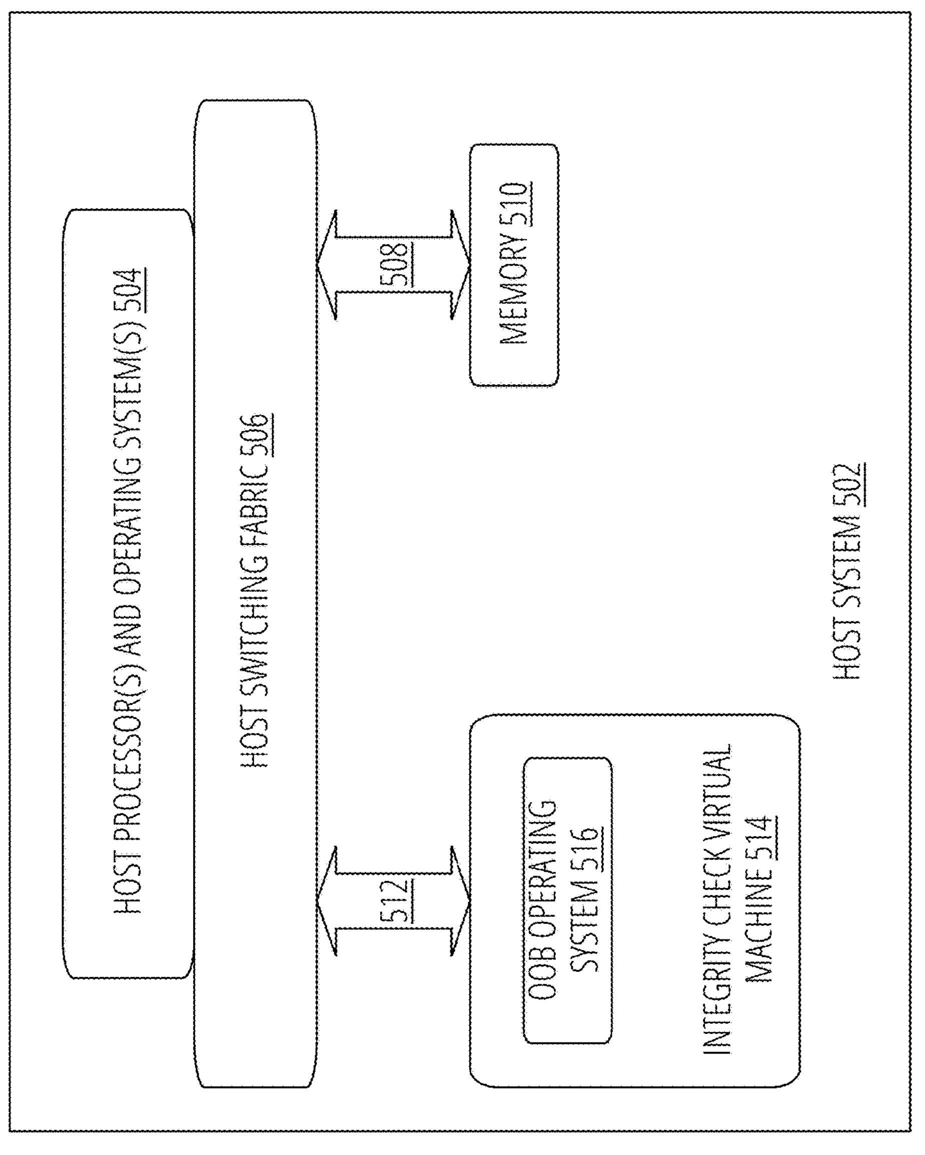
FIG. 5 is an example use case for an OOB integrity check architecture.

FIG. 5 is an example use case for an OOB integrity check architecture. The example of FIG. 5 utilizes the peer-to-peer functionality provided by PCIe switches and buses. In the example of FIG. 5, host system 502 includes host processor(s) and operating system(s) 504 configured to communicate with memory 510 over host switching fabric 506 and switch fabric interconnect 508. In an example, host switching fabric 506 is a PCIe-compliant switching fabric (e.g., system bus). Other communications protocols can also be supported. In an example, switch fabric interconnect 508 and/or switch fabric interconnect 512 include PCIe-compliant physical interfaces that allow hardware devices (e.g., memory 510, integrity check virtual machine 514) to connect to host switching fabric 506.

Host system 502 can include additional components (e.g., network interfaces, input/output devices, additional storage devices and/or memory, GPU) not illustrated in FIG. 5. In the PCIe example, host processor(s) and operating system(s) 504 interacts with memory 510 according to PCIe protocols. In an example, memory 510 in an NVMe disk (or NVMe memory). Other types of memory can also be supported.

As described below, an eternal or otherwise isolated system can perform integrity checks on data stored in memory 510. In the example of FIG. 5, the isolated integrity check architecture is provided by integrity check virtual machine 514, having OOB operating system 516 coupled with memory 510 via switch fabric interconnect 512, host switching fabric 506, and switch fabric interconnect 508. For example, the PCIe-supported peer-to-peer functionality is utilized to allow host processor(s) and operating system(s) 504 and OOB operating system 516 to interact with memory 310 independently. This allows integrity check virtual machine 514 to be an independent integrity checker of memory 510, even when host processor(s) and operating system(s) 504 and/or other components of host system 502 have been compromised.

In one example, integrity check virtual machine 514 can be an independent virtual machine operating on host system 502 to at least provide the verification functionality described herein. In an example, OOB operating system 516 is verified using a signature during the boot sequence for integrity check virtual machine 514. In an example, during startup of host system 502, at least one queue for memory 510 is allocated to integrity check virtual machine 514. In an example, OOB operating system 516 mounts a filesystem as read-only and continuously checks the integrity of one or more files stored by memory 510. In an example, all files stored by memory 510 are checked; however, as another example, only selected files stored by memory 510 are checked.

Figure 6:
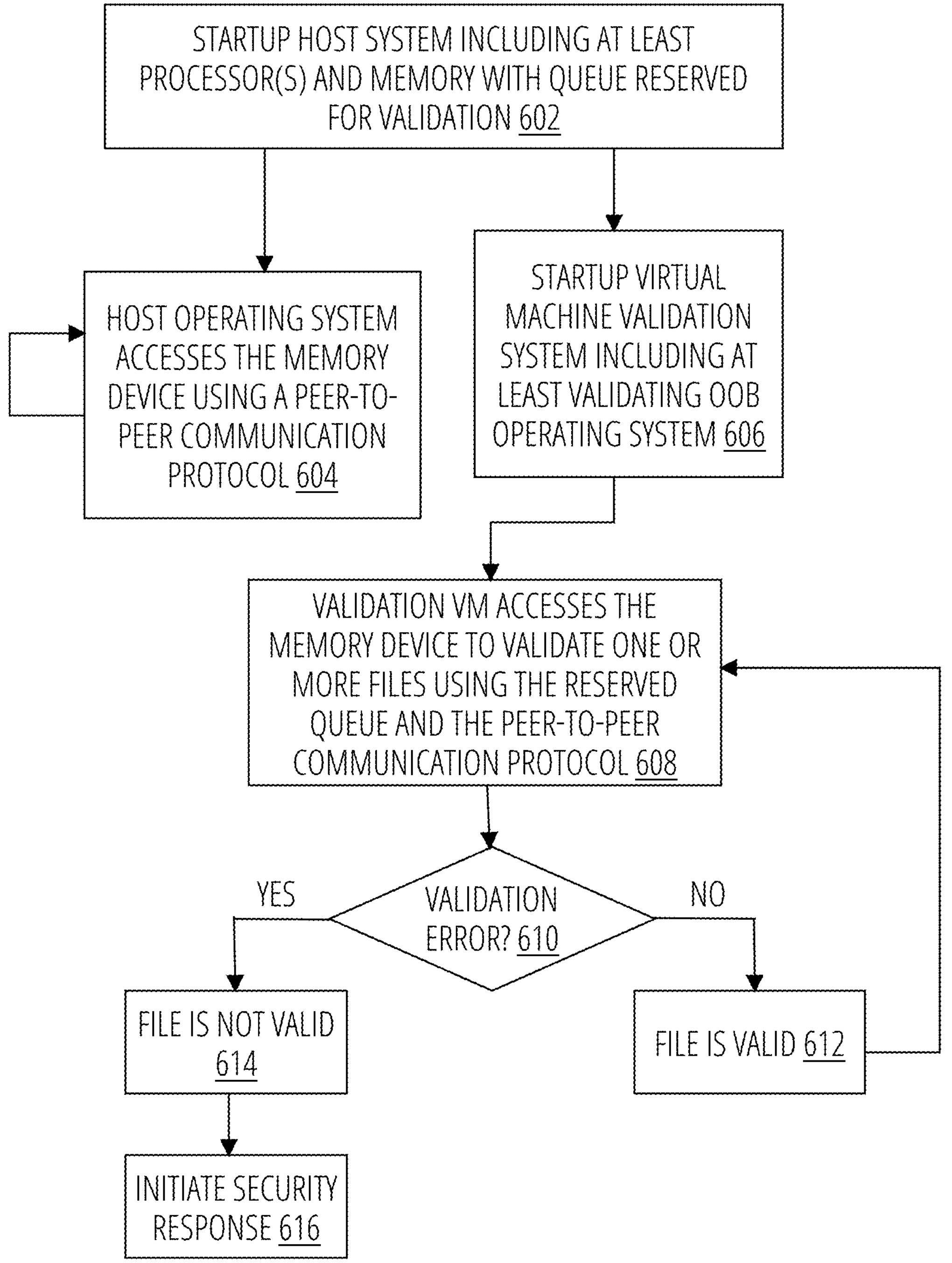
FIG. 6 is a flow diagram of an example approach to OOB integrity check functionality.

FIG. 6 is a flow diagram of an example approach to OOB integrity check functionality. The functionality described with respect to FIG. 6 can be utilized with, for example, the architecture of FIG. 3. Various approaches can be used to achieve this result.

In an example, the host system goes through a startup process where at least one queue for the memory system is reserved for validation purposes, 602. The startup process for the host system can involve various other procedures to prepare the host system for operation. In general, startup processes are well understood within the relevant arts.

After startup, the host system can utilize the host operating system to access the memory device using a peer-to-peer communication protocol, 604. The host operating system can access the memory device independently of, and in parallel with, validation operations that are performed on the memory device.

After the host system startup (e.g., 602), the virtual machine (VM) validation system can go through a startup process where the validation system operating system (aka, OOB operating system) is validated. The startup process for the host system can involve various other procedures to prepare the host system for operation. In general, startup processes are well understood within the relevant arts.

After startup, the VM validation system can access the memory device using the reserved queue and the peer-to-peer communication protocol to verify one or more files stored on the memory device, 608. Various validation procedures can be utilized to verify files on the memory device. Because the peer-to-peer communication protocol is used, the validation processes can occur in parallel to memory accesses by the host operating system (e.g., 604).

As long as a validation error does not occur, 610, the file is considered valid, 612, and the validation system can continue the validation process, 608. When a validation error does occur, 610, the file is considered not valid, 614, and a security response is initiated, 616. In an example, failure of a validity check performed by the OOB operating system is considered a validation error (e.g., 610). In an example, failure to access the memory device (e.g., access being blocked or removed) is considered a validation error (e.g., 610).

FIG. 7 is an example of a system (e.g., validation server or similar) to identify an image that has replaced an authenticated image. In an example, system 702 can include processor(s) 704 and non-transitory computer-readable storage medium 706. Non-transitory computer-readable storage medium 706 may store instructions 708, 710, 712, 716, 718, 720 and 722 that, when executed by processor(s) 704, cause processor(s) 704 to perform various functions. Examples of processor(s) 704 may include a microcontroller, a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer-readable storage medium 706 include tangible media such as random-access memory (RAM), read-only memory (ROM), electrically erasable programmable read-only memory (EEPROM), flash memory, a hard disk drive, etc.

Instructions 708 cause processor(s) 704 to perform startup operations on the host system, including at least initiating the host system processor(s) and memory, including reserving a queue for validation purposes. In an example, the host system utilizes peer-to-peer functionality provided, for example, by PCIe switches and buses.

Instructions 710 cause processor(s) 704 to cause the host operating system to access the memory using the peer-to-peer communication protocol. As mentioned above, the peer-to-peer communication protocol can be a PCIe-compliant protocol. In other examples, different peer-to-peer communication protocols can be used.

Instructions 712 cause processor(s) 704 to determine if the validation system is a validation agent (e.g., FIG. 3, FIG. 4) or a validation virtual machine (e.g., FIG. 5, FIG. 6). In an example, the instructions stored on non-transitory computer-readable storage medium 706 provide the functionality to manage multiple types of validation systems. In other examples, the instructions can be more specialized.

Instructions 714 cause processor(s) 704 to perform startup operations on the validation system, including at least validating the OOB operating system, if validation is provided by a validation agent. Instructions 718 cause processor(s) 704 to perform startup operations on the VM validation system, including at least validating the OOB operating system if validation is provided by a VM validation agent.

Instructions 720 cause processor(s) 704 to determine if a validation error has occurred. Instructions 722 cause processor(s) 704 to trigger a validation error response if a validation error has occurred.

Figure 8:
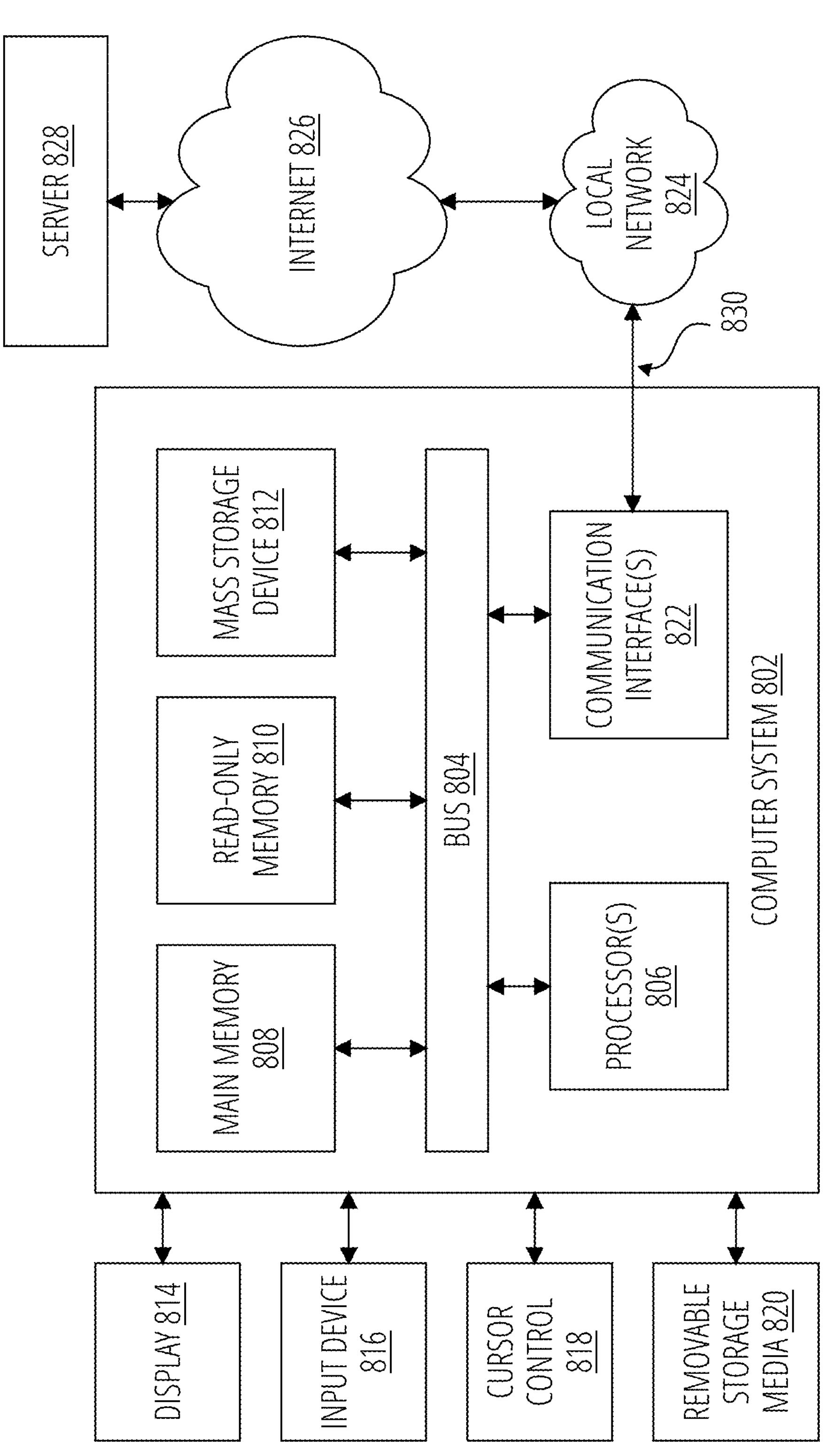
FIG. 8 is a block diagram that illustrates a computer system in which or with which an embodiment of the present disclosure may be implemented.

FIG. 8 is a block diagram that illustrates a computer system in which or with which an embodiment of the present disclosure may be implemented (e.g., host system 302). Computer system 802 may be representative of an endpoint or client device (e.g., one of the off-net clients or on-net clients) on which an endpoint security agent is running and acting as a proxy on behalf of a client application (e.g., a browser). Notably, components of computer system 802 described herein are meant only to exemplify various possibilities. In no way should example computer system 802 limit the scope of the present disclosure. In the context of the present example, computer system 802 includes bus 804 or other communication mechanism for communicating information and one or more processing resources (e.g., one or more hardware processor(s) 806) coupled with bus 804 for processing information. Hardware processor(s) 806 may include, for example, one or more general-purpose microprocessors available from one or more current or future microprocessor manufacturers (e.g., Intel Corporation, Advanced Micro Devices, Inc., and/or the like) and/or one or more special-purpose processors (e.g., CPs, NPs, and/or accelerators or co-processors). In some examples, one or more processing resources may be part of an ASIC-based security processing unit (e.g., the FORTISP family of security processing units available from Fortinet, Inc. of Sunnyvale, CA).

Computer system 802 also includes main memory 808, such as a random access memory (RAM) or other dynamic storage device, coupled to bus 804 for storing information and instructions to be executed by processor(s) 806. Main memory 808 also may be used for storing temporary variables or other intermediate information during execution of instructions to be executed by processor(s) 806. Such instructions, when stored in non-transitory storage media accessible to processor(s) 806, render computer system 802 into a special-purpose machine customized to perform the operations specified in the instructions.

Computer system 802 includes a read-only memory 810 or other static storage device coupled to bus 804 for storing static information and instructions for processor(s) 806. Mass storage device 812 (e.g., a magnetic disk, optical disk or flash disk (made of flash memory chips), is provided and coupled to bus 804 for storing information and instructions.

Computer system 802 may be coupled via bus 804 to display 814 (e.g., a cathode ray tube (CRT), Liquid Crystal Display (LCD), Organic Light-Emitting Diode Display (OLED), Digital Light Processing Display (DLP) or the like, for displaying information to a computer user. Input device 816, including alphanumeric and other keys, is coupled to bus 804 for communicating information and command selections to processor(s) 806. Another type of user input device is cursor control 818, such as a mouse, a trackball, a trackpad, or cursor direction keys for communicating direction information and command selections to processor(s) 806 and for controlling cursor movement on display 814. This input device typically has two degrees of freedom in two axes, a first axis (e.g., x) and a second axis (e.g., y), that allows the device to specify positions in a plane.

Removable storage media 820 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 802 may implement the techniques described herein using customized hard-wired logic, one or more ASICs or FPGAs, firmware or program logic which in combination with the computer system causes or programs computer system 802 to be a special-purpose machine. According to one embodiment, the techniques herein are performed by computer system 802 in response to processor(s) 806 executing one or more sequences of one or more instructions contained in main memory 808. Such instructions may be read into main memory 808 from another storage medium, such as mass storage device 812. Execution of the sequences of instructions contained in main memory 808 causes processor(s) 806 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic, or flash disks, such as mass storage device 812. Volatile media includes dynamic memory, such as main memory 808. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wires, and fiber optics, including the wires that comprise bus 804. Transmission media can also be acoustic or light waves, such as those generated during radio-wave and infrared data communications.

Various forms of media may be involved in carrying one or more sequences of one or more instructions to processor(s) 806 for execution. For example, the instructions may initially be carried on a magnetic disk or solid-state drive of a remote computer. The remote computer can load the instructions into its dynamic memory and send the instructions over a telephone line using a modem. A modem local to computer system 802 can receive the data on the telephone line and use an infra-red transmitter to convert the data to an infra-red signal. An infra-red detector can receive the data from the infra-red signal, and appropriate circuitry can place the data on bus 804. Bus 804 carries the data to main memory 808, from which processor(s) 806 retrieve and execute the instructions. The instructions received by main memory 808 may optionally be stored on mass storage device 812 either before or after execution by processor(s) 806.

Computer system 802 also includes communication interface(s) 822 coupled to bus 804. Communication interface(s) 822 provides a two-way data communication coupling to network link 830 that is connected to local network 824. For example, communication interface(s) 822 may be an integrated services digital network (ISDN) card, cable modem, satellite modem, or a modem to provide a data communication connection to a corresponding type of telephone line. Another example is communication interface(s) 822, which may be a local area network (LAN) card that provides a data communication connection to a compatible LAN. Wireless links may also be implemented. In any such implementation, communication interface(s) 822 sends and receives electrical, electromagnetic or optical signals that carry digital data streams representing various types of information.

Network link 830 typically provides data communication through one or more networks to other data devices. Local network 824 and internet 826 both use electrical, electromagnetic or optical signals that carry digital data streams. The signals through the various networks and network link 830 and through communication interface(s) 822, which carry the digital data to and from computer system 802, are example forms of transmission media.

Computer system 802 can send messages and receive data, including program code, through the network(s), network link 830 and communication interface(s) 822. In the Internet example, server 828 might transmit a requested code for an application program through internet 826, local network 824 and communication interface(s) 822. The received code may be executed by processor(s) 806 as it is received or stored in mass storage device 212 or other non-volatile storage for later execution.

Embodiments may be implemented as any or a combination of one or more microchips or integrated circuits interconnected using a parent board, hardwired logic, software stored by a memory device and executed by a microprocessor, firmware, an application-specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include but is not limited to, floppy diskettes, optical disks, CD-ROMs (Compact Disc-Read Only Memories), magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown, nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as the following claims.

Reference in the specification to "one example" or "an example" means that a particular feature, structure, or characteristic described in connection with the example is included in at least one embodiment of the disclosure. The appearances of the phrase "in one example" in various places in the specification do not necessarily refer to the same embodiment.

It is contemplated that any number and type of components may be added to and/or removed to facilitate various embodiments, including adding, removing, and/or enhancing certain features. For brevity, clarity, and ease of understanding, many standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component," "module," "system," and the like as used herein are intended to refer to a computer-related entity, either software-executing general-purpose processor, hardware, firmware, or a combination thereof. For example, a component may be, but is not limited to, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer-readable media with various data structures stored thereon. The components may communicate via local and/or remote processes, such as in accordance with a signal having one or more data packets (e.g., data from one component interacting with another component in a local system, distributed system, and/or across a network such as the Internet with other systems via the signal).

Computer-executable components can be stored, for example, on non-transitory, computer-readable media including, but not limited to, an ASIC, CD, DVD, ROM, floppy disk, hard disk, EEPROM, memory stick or any other storage device type, in accordance with the claimed subject matter.

What is claimed is:

1. A system comprising:

a switching fabric supporting a communications protocol between at least two system components and a memory device;

a host system having one or more host hardware processors and a host operating system to run on the one or more host hardware processors to communicate with at least the memory device using the communications protocol over the switching fabric; and an integrity check agent having one or more out-of-band (OOB) hardware processors and an OOB operating system to run on the one or more OOB hardware processors to communicate with at least the memory device using the communications protocol over the switching fabric, the integrity check agent configured to reserve a memory queue for validation and to access the memory device using the reserved memory queue, the OOB operating system to perform integrity checks on one or more files stored on the memory device.

2. The system of claim 1 wherein the integrity check agent comprises an integrity check module wherein the one or more OOB hardware processors comprises at least one embedded processor to run the OOB operating system, the integrity check module further comprising a hardware input/output interface to physically connect to the switching fabric to provide a communication channel between the OOB operating system and the memory device.

3. The system of claim 2 wherein the hardware input/output interface comprises a PCIe-compliant interface.

4. The system of claim 1 wherein the host system comprises a physical machine and the integrity check agent comprises a virtual machine.

5. The system of claim 1 wherein the switching fabric comprises a host system bus.

6. The system of claim 5 wherein the host system bus is a PCIe-compliant bus.

7. The system of claim 1 wherein the communications protocol comprises a PCIe-compliant communications protocol with peer-to-peer capability.

8. The system of claim 1 wherein the memory device comprises a Non-Volatile Memory Express (NVMe)-compliant memory device.

9. A method comprising:

initiating a startup sequence for a host system having at least a hardware processor coupled with a memory device, the startup sequence comprising at least reserving a memory queue for validation;

causing the hardware processor of the host system to access the memory device using a communications protocol;

initiating a startup sequence for an integrity check agent comprising at least validating an out-of-band (OOB) operating system that functions independently of a host operating system running on the host system;

causing the integrity check agent to access the memory device using the reserved memory queue and the communications protocol to check validity of one or more files stored on the memory device;

initiating a security response in response to failure of an invalidity check.

10. The method of claim 9 wherein the integrity check agent comprises an integrity check module wherein the one or more OOB hardware processors comprises at least one embedded processor to run the OOB operating system, the integrity check module further comprising a hardware input/output interface to physically connect to the switching fabric to provide a communication channel between the OOB operating system and the memory device.

11. The method of claim 10 wherein the integrity check agent is external to the host system.

12. The method of claim 9 wherein the integrity check agent comprises a virtual machine running on the host system.

13. The method of claim 9 wherein the communications protocol comprises a PCIe-compliant peer-to-peer communications protocol.

14. The method of claim 9 wherein the integrity check agent being blocked from the memory device comprises a validation error condition.

15. A non-transitory computer-readable storage medium having stored thereon instructions that, when executed, cause one or more processors to:

initiate a startup sequence for a host system having at least a hardware processor coupled with a memory device, the startup sequence comprising at least reserving a memory queue for validation;

cause the hardware processor of the host system to access the memory device using a communications protocol;

initiate a startup sequence for an integrity check agent comprising at least validating an out-of-band (OOB) operating system that functions independently of a host operating system running on the host system;

cause the integrity check agent to access the memory device using the reserved memory queue and the communications protocol to check validity of one or more files stored on the memory device;

initiate a security response in response to failure of an invalidity check.

16. The non-transitory computer-readable storage medium of claim 15 wherein the integrity check agent comprises an integrity check module wherein the one or more OOB hardware processors comprises at least one embedded processor to run the OOB operating system, the integrity check module further comprising a hardware input/output interface to physically connect to the switching fabric to provide a communication channel between the OOB operating system and the memory device.

17. The non-transitory computer-readable storage medium of claim 16 wherein the integrity check agent is external to the host system.

18. The non-transitory computer-readable storage medium of claim 16 wherein the integrity check agent comprises a virtual machine running on the host system.

19. The non-transitory computer-readable storage medium of claim 16 wherein the communications protocol comprises a PCIe-compliant peer-to-peer communications protocol.

20. The non-transitory computer-readable storage medium of claim 16 wherein the integrity check agent being blocked from the memory device comprises a validation error condition.

* * * * *